United States Patent [19]

Unger

[11] 3,883,703

[45] May 13, 1975

[54] METHOD FOR CONDITIONING TRANSMISSION LINES UTILIZING ADJUSTABLE EQUALIZERS AND A RECORDING TECHNIQUE

[75] Inventor: Joseph Kenneth Unger, Morristown, N.J.

[73] Assignee: RCA Corporation, New York, N.Y.

[22] Filed: Nov. 12, 1973

[21] Appl. No.: 414,964

[52] U.S. Cl. ........................ 179/175.3 R; 178/69 A

[51] Int. Cl. ........................ H04b 3/46

[58] Field of Search .................... 179/175.3 R, 16 F; 178/69 A; 328/162; 333/18, 28

[56] References Cited

UNITED STATES PATENTS

| | | | |
|---|---|---|---|
| 3,213,196 | 10/1965 | Tuck et al. | 179/175.3 R |
| 3,335,223 | 8/1967 | Johannesson et al | 178/69 A |
| 3,422,222 | 1/1969 | Lord | 179/175.3 R |
| 3,742,360 | 6/1973 | Ragsdale | 333/18 |

*Primary Examiner*—Kathleen H. Claffy
*Assistant Examiner*—Douglas W. Olms
*Attorney, Agent, or Firm*—Edward J. Norton; Joseph S. Tripoli

[57] ABSTRACT

A method is disclosed for conditioning transmission lines for a desired response. The method utilizes pre-recorded test signals transmitted over the unequalized transmission line. The response of the unequalized line to the test signal is recorded. The recorded response is then played through an adjustable equalizer off-line and the equalizer is adjusted for a particular response. The equalizer is then inserted in the transmission line.

14 Claims, 6 Drawing Figures

METHOD FOR CONDITIONING TRANSMISSION LINES UTILIZING ADJUSTABLE EQUALIZERS AND A RECORDING TECHNIQUE

The present invention relates generally to a method for conditioning transmission lines and more particularly to a line conditioning method employing adjustable equalizers and a recording technique.

There are many instances where transmission lines for voice and/or data are maintained. Some of these lines connect users who are at enormous distances one from another. In order to establish and maintain the quality of transmission over these lines, the lines must be conditioned.

Transmission lines for voice and/or data have unconditioned amplitude and signal delay characteristics which vary with frequency. Thus, the term line conditioning refers to the activity involved in providing, among other things, a fairly flat amplitude and signal delay response over a range of frequencies for a transmission line. In addition, line conditioning is concerned with such parameters as harmonic distortion, intermodulation distortion, phase jitter, white and impulse noise and the appearance of spurious signals.

A great deal of effort has been expended in the art in developing equalizer devices for line conditioning purposes. These devices usually comprise many cascaded stages, each stage covering a portion of the frequency band of interest and each stage having adjustable elements contained therein. Each stage may be adjusted for the desired amplitude and signal delay response in order to bring the overall response of the line within the required specification.

In the usual equalizer situation, the users will be connected by one or more transmission lines. Technically, it is desirable to physically locate the equalizers at the receiving end of the transmission line. However, very often it is not practical to locate the equalizers at a user end of the line. This is especially true where a common carrier maintains the transmission line. In this case the equalizers are usually located in a control station located between the users of the line.

In the common carrier situation, the present day equalization procedure runs along the following lines. Technical personnel are dispatched to both ends of the line or lines, i.e. to the user locations, with a sizeable amount of test equipment. With no equalizers on the lines signals from test sets are sent from one end of the line to the other end where the response of the line is measured. The process is repeated in the opposite direction. All of the data is brought back to the central location. The data is used to construct graphs of such things as amplitude and delay response over the frequency band. Now characteristics for the equalizers are graphically constructed at the control station. The equalizers are set up as per the graphs and inserted in the line. At this point all of the measurements from end to end are repeated and the data is once again sent to the control station. If the lines do not meet the required specification at this point, the graphical procedure is repeated.

It should be noted that the above outlined procedure requires a substantial amount of time and effort by highly trained technical personnel. In addition, the test equipment required is fairly extensive and costly. All of these problems are compounded when the users are separated by large distances. In some cases the users may be continents apart.

The present invention provides a method for conditioning a transmission line which is easily implemented, does not require the services of highly skilled personnel and does not require extensive and costly equipment.

In accordance with the present invention, a method is provided for conditioning a transmission line with an adjustable equalizer device. The transmission line links two communications stations. The method comprises the steps of: transmitting a pre-recorded test signal over the unequalized transmission line linking the two stations; recording the signal received at one of the stations in response to the test signal transmitted; playing the recorded signal through an equalizer device off-line; adjusting the equalizer for a desired response to the recorded received signal; and inserting the adjusted equalizer in the transmission line between the two stations.

IN THE DRAWING

Figure 1:
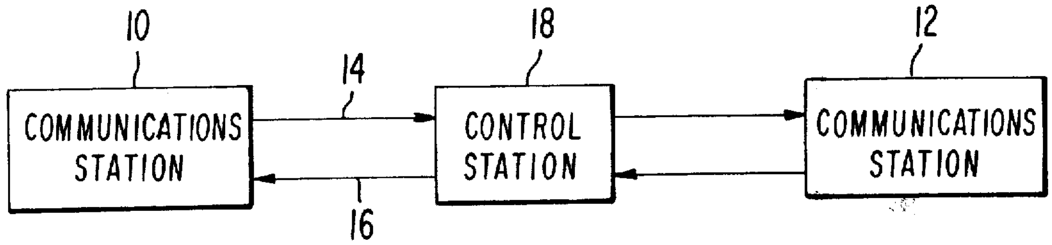
FIG. 1 is a block diagram of one system where the present invention may be utilized.

Referring now to FIG. 1, two cmmunications stations 10 and 12 are linked by two transmission lines 14 and 16. Transmission line 14 is used to send messages, data and/or voice, from station 10 to station 12, whereas transmission line 16 is used to send messages, data and/or voice, from station 12 to station 10. A control station 18 is connected in the circuit between stations 10 and 12. Control station 18 will typically monitor the transmission lines 14 and 16 and provide control functions, billing functions and other activities for the maintenance of service between stations 10 and 12. In the common carrier situation, station 10 may be a customer-user located in the U.S., station 12 may be a foreign customer-user located in Europe and station 18 may be a control station located in, say, New York City.

Figure 2:
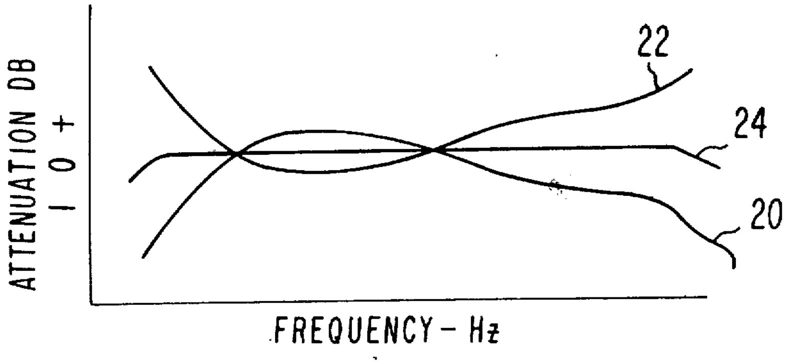
FIGS. 2 and 3 are plots useful in explaining the present invention.

If one were to analyze the amplitude response of transmission line 16 over a frequency band, a curve similar to line 20 in FIG. 2 might be constructed. It must be appreciated that in order to obtain the data to generate the plot of line 20, a technician must be dispatched to station 12 with a full test set up. The person at station 12 will transmit a reference level signal with a frequency which varies across the band of interest. Another person at station 10 receives the data of amplitude levels at various frequencies and the data is then sent to station 18 where the graph is made up. A similar test procedure is then followed for line 14 with the person at station 10 sending test signals to the person at station 12. The test equipment at stations 10 and 12 required for this procedure comprises a test oscillator, a frequency meter, a dbm level meter, and a wave analyzer for measuring wave distortion.

Once the amplitude response, similar to line 20, is plotted, an inverse curve, such as line 22, is constructured. Line 22 represents the amplitude characteristic over the frequency band of interest which a compensating device, such as an equalizer, must possess. When line 22 is algebraically added to line 20, the equalized line 24 should be obtained. One now selects two equalizers, one for transmission line 14 and one for transmission line 16, and based on the curves corresponding to line 22 an attempt is made to adjust these equalizers for the desired amplitude response. The two equalizers are now placed respectively in transmission lines 14 and 16 at the control station 18. The test procedure is repeated. If the lines meet the specification imposed thereon, then the next parameter, delay response, is measured. If the lines do not meet the specification, then the entire graphical procedure is repeated and more adjustments are made to the equalizers.

Figure 3:
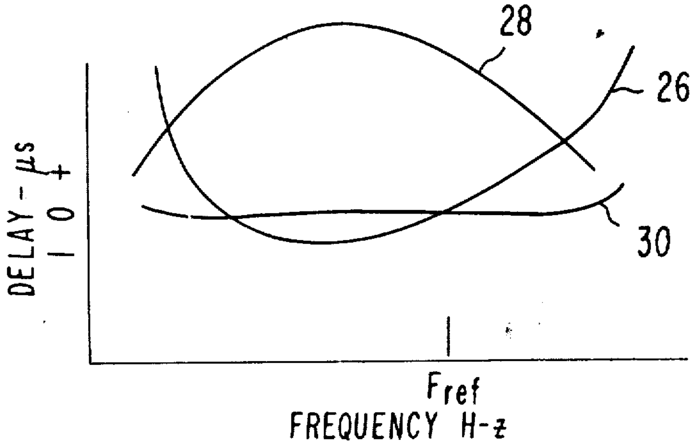

Once the amplitude response meets the specification, the transmission lines are measured for their signal delay response over the frequency band. Another set of test equipment at each of the stations 10 and 12 is required. Typically, the person at station 10 will send a reference signal, at say 2000 Hz, to station 12 over the unequalized line 14. The person at station 12 checks this reference signal and then requests station 10 to change the frequency of the signal in steps, say 100 Hz, steps, from the low to the high end of the frequency band. The person at station 12 tabulates the signal delay relative to the reference frequency signal and forwards the data to control station 18. At station 18 a plot of the delay relative to the reference signal is constructed as in FIG. 3, line 26. An inverse curve is then constructed as shown in FIG. 3, line 28. Line 28 represents the amount of time delay which must be added via an equalizer in order to obtain a flat response, such as line 3, within the specification across the frequency band. The same procedure is followed for transmission line 16.

With the equalizers at control station 18 adjusted for delay and in the transmission lines 14 and 16, the personnel at stations 10 and 12 must repeat the amplitude measurements because the adjustments for delay response may have altered the amplitude response of the equalizers used in lines 14 and 16.

At this point in time personnel at stations 10 and 12 proceed to make noise measurements, distortion measurements and jitter measurements on the equalized lines 14 and 16.

The procedure outlined above has on occasion taken days and even weeks to complete by skilled personnel in order to equalize or condition certain transmission lines. The method which follows herein is such that unskilled personnel may complete the same equalization job in a matter of a few hours.

The only equipment required for the present method is a suitable tape recorder, such as the Ampex AG600, a tape recording of a test signal and a blank tape. More generically speaking, all that is required by way of equipment is a signal recording and playback means, a pre-recorded test signal and a blank recording means. This equipment is located at each of the stations 10, 12 and 18.

Conveniently, the pre-recorded test signal may be the type of signal used previously for delay response measurements. The signal from a test instrument, such as the Wandel Goltermann LD2 unit, is recorded, on tape, directly from the instrument. The LD2 is set to sweep the desired frequency band, say from 300 Hz to 3000 Hz. The sweep rate is adjusted typically for about 30 cycles per second. This swept frequency sine wave is modulated by a low frequency, say 41.66 Hz signal. For an interval of 0.25 seconds the modulated swept frequency is recorded, followed by a recording of 0.25 seconds of a 2000 Hz reference frequency modulated by the 41.66 Hz signal. These two types of signals are alternately recorded for a given period of time.

The full test tape will run typically for 30 minutes and will comprise the following portions: 1 minute of blank tape; 10 minutes of the alternating signals mentioned above; 1 minute of blank tape; 10 minutes of a pure 1000 Hz sine wave; and 8 minutes of blank tape.

The advantage of recording test signals is that the original can be made under controlled conditions of calibration and quality. Duplicates may then be made without further set up or instrument calibration.

The tape method for equalization runs as follows. A person at station 10 plays his test tape or pre-recorded test signal at a nominal level through the unequalized circuit comprising transmission line 14, through control station 18 to station 12. Station 12 records the response to the test signal recieived thereat. At the same time, a person at control station 18 records the signal going from station 10 to station 12 as the signals pass station 18. The process is then repeated from station 12 to station 10 over transmission line 16 with control station 18 and station 10 making recordings. Except for one minor step to be described later, stations 10 and 12 have completed their assignments and nothing further is required of them.

At this point the personnel at control station 18 may proceed to equalize or condition transmission lines 14 and 16 in either of two ways. One procedure is used when the tape recordings made at stations 10 and 12 are sent to station 18. The other procedure allows for equalization without the tapes made at stations 10 and 12 available at control station 18.

Figure 4:
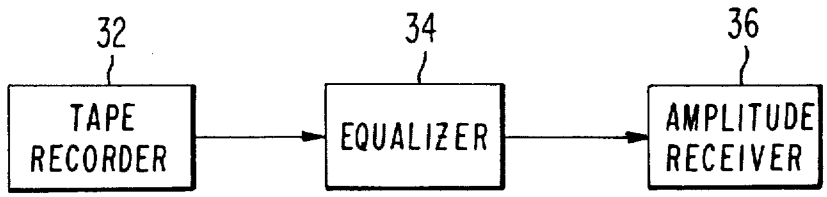
FIG. 4 is a block diagram illustrating one step in practicing the method of the present invention.

In the first of the two procedures, and referring to FIG. 4, the control station 18 connects his tape recorder 32 output terminal to the input terminal of an equalizer 34 which is off-line. The output terminal of equalizer 34 is connected to the input terminal of the amplitude receiver measuring set 36 such as the LD2 unit. The tape which was recorded at station 12, representing the unequalized circuit over line 14, is played through the off-line equalizer 34. As the tape sweeps through the various frequencies, the person performing the equalization adjusts the appropriate frequency sections of the equalizer 34 to give a uniform amplitude response on the receiver 36. The same procedure is followed in setting up a second equalizer for the circuit including transmission line 16. That is, the tape recorded signals at station 10 are played via tape recorder 32, into a second equalizer, off-line, which is adjusted for a uniform amplitude response on unit 36. The amplitude equalization adjustments are now complete.

Figure 5:
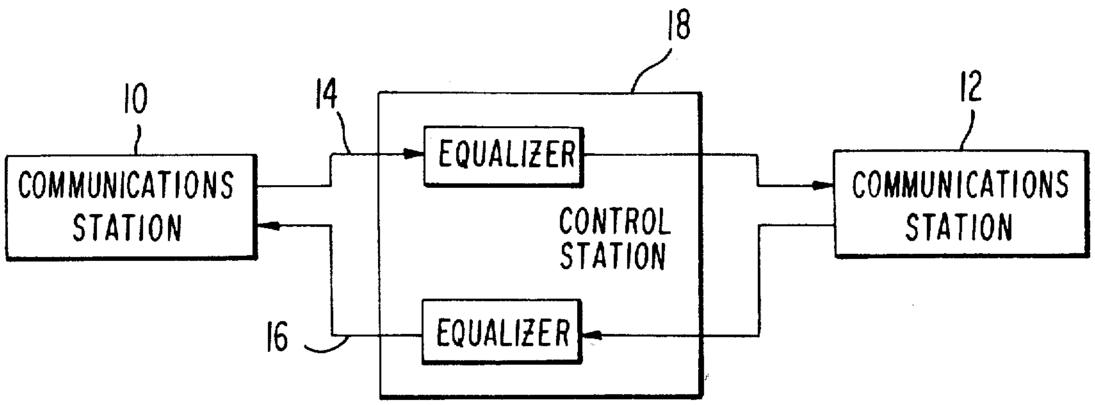
FIG. 5 is a block diagram helpful in explaining the practice of the inventive method under one set of circumstances.

The measuring instrument 36, such as the LD2, is now switched to the delay mode. Once again the signals recorded at stations 12 and 10 are played via tape recorder 32 through the corresponding off-line equalizers and adjustments are made to get a uniform delay response across the band as the tape sweeps through the various frequencies. Amplitude and delay equalization are now completed and the equalizers may be installed in lines 14 and 16 at the control station 18 as shown in FIG. 5.

In the second of the two procedures, and referring to FIG. 6, the personnel at the control station 18 may equalize the circuits on lines 14 and 16 without the tapes recorded at stations 10 and 12 as follows. The control station 18 had previously recorded signals passing station 18 and transmitted from station 10. This recording represents the response of the unequalized portion of the circuit between stations 10 and 18, including a portion of transmission line 14 designated L1. Station 18 plays this tape through equalizer 40 off-line. Station 18 adjusts equalizer 40, as above, for an equal amplitude and delay response. Equalizer 40 is then installed in the circuit between stations 10 and 18 at control station 18. The line L1 is now equalized.

At this point, station 10 closes loop key 42. Key 42 is a switch mechanism which electrically connects the transmit line 14 to the receive line 16 at station 10. The closing of loop key 42 was the step mentioned previously. Now station 18 transmits a pre-recorded test signal on line 16, entering at point Y, toward station 10, through loop key 42, over line portion L1 and through equalizer 40 to a point X in station 18. The signal appearing at point X is recorded at station 18. The recorded signal represents the unequalized portion of line 16 designated L2. The signal thus recorded is played through equalizer 44 off-line and the adjustments are made as above for the amplitude and delay response. Equalizer 44 is now installed in line 16 at control station 18. The circuit between stations 10 and 18 and the circuit between stations 18 and 10 are now equalized.

Similarly, station 18 has previously recorded signals passing through from station 12 to station 10 over unequalized line 16. This recorded signal represents the unequalized portion of line 16 designated as L3. This signal is played through equalizer 46 off-line, the adjustments are made and equalizer 46 is installed in line 16 at station 18.

Now the loop key 48 at station 12 is closed thus connecting line 14 to line 16 at station 12. A test signal is now transmitted from control station 18 over a portion of line 14 designated L4, through loop key 48, over line portion L3, through equalizer 46 and recorded at point Z. This signal is then played through equalizer 50 off-line, the adjustments are made and equalizer 50 is installed in line 14 at station 18.

Figure 6:
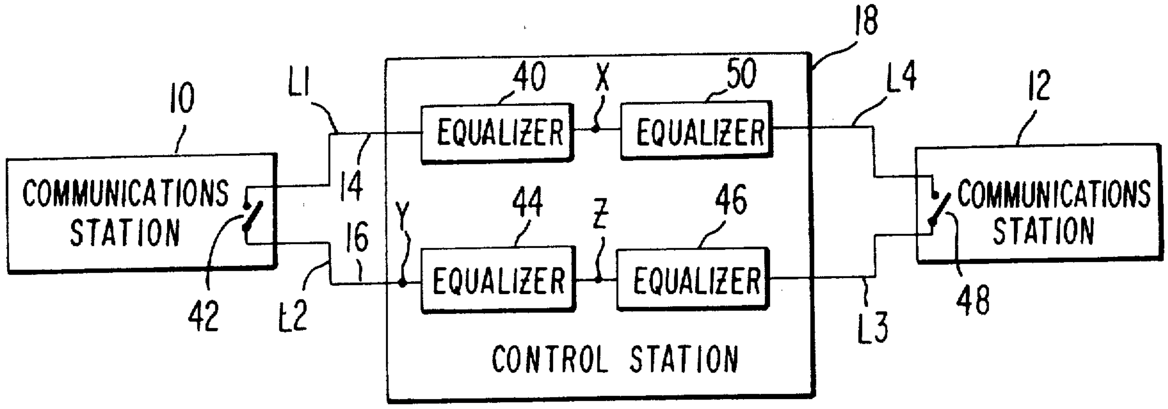
FIG. 6 is a block diagram helpful in explaining the practice of the inventive method under another set of circumstances.

When the equalizers 40, 44, 46 and 50 are connected as shown in FIG. 6, after having been adjusted, the entire circuit over transmission lines 14 and 16 is completely equalized. When the tapes recorded at stations 10 and 12 arrive at station 18, the first procedure described above may be used to readjust two of the equalizers so that the other two can be removed from the circuit.

The signals recorded at the various stations in response to the pre-recorded test signal may also be played into the appropriate instruments to check such parameters as distortion, jitter, noise and spurious signals. Once the equalizers, in either of the two approaches, are adjusted and installed, the test signal can be replaced from one station to the other, i.e. end to end, to make sure that the full circuit meets the specification for these other parameters.

The tapes recorded at stations 10 and 12 can be used at station 18 for circuit maintenance, duplicating equalizers, correcting aging or drifting equalizers, etc.

Since the recordings are of actual line signals, checks and adjustments are exactly equivalent to transporting the equalizers to stations 10 and 12.

Thus, the method herein described demonstrates an equalization or line conditioning procedure which does not require complex pieces of equipment or highly skilled technical personnel to implement.

What is claimed is:

1. A method for conditioning a transmission line with an adjustable equalizer device, said transmission line linking two communications stations, said method comprising the steps of:

transmitting a magnetically pre-recorded test signal from one station to the other station over the unequalized transmission line linking said two stations;

recording the received signal on a magnetic storage medium at said other station in response to said test signal;

playing said recorded received signal through said equalizer device off-line;

adjusting said equalizer device for a desired response to said recorded received signal; and inserting said adjusted equalizer in said transmission line between said two stations.

2. The method according to claim 1 wherein said equalizer is adjusted for a desired amplitude response prior to insertion between said two stations.

3. The method according to claim 2 wherein said equalizer is adjusted for a desired signal delay response after being adjusted for said desired amplitude response and prior to the step of inserting said equalizer between said two stations.

4. The method according to claim 3 wherein at least a portion of said pre-recorded test signal comprises a varying frequency signal.

5. The method according to claim 4 wherein said equalizer is inserted between said two stations at a control station located between said two stations.

6. A method for conditioning first and second transmission lines respectively with first and second adjustable equalizer devices, said first transmission line linking a first communications station to a second communications station, said second tramsmission line linking said second communications station to said first communications station, said method comprising the steps of:

transmitting a magnetically pre-recorded test signal from said first station to said second station over the unequalized first transmission line;

recording the received signal on a magnetic storage medium at said second station in response to said test signal;

playing said received signal recorded at said second station through said first equalizer device off-line;

adjusting said first equalizer device for a desired response to said signal recorded at said second station;

inserting said adjusted equalizer device in said first transmission line between said first and second stations;

transmitting said magnetically pre-recorded test signal from said second station to said first station over the unequalized second transmission line;

magnetically recording the received signal at said first station in response to said test signal transmitted from said second station;

playing said received signal recorded at said first station through said second equalizer device off-line;
adjusting said second equalizer device for a desired response to said signal recorded at said first station; and
inserting said adjusted second equalizer device in said second transmission line between said second and first stations.

7. The method according to claim 6 wherein said first and second equalizers are adjusted for a desired amplitude response prior to being inserted respectively into said first and second transmission lines.

8. The method according to claim 7 wherein said first and second equalizers are adjusted for a desired signal delay response after having been adjusted for their respective desired amplitude responses and prior to the steps of inserting said first and second equalizers into said first and second transmission lines respectively.

9. The method according to claim 8 wherein at least a portion of said test signal comprises a varying frequency signal.

10. The method according to claim 9 wherein said adjusted first and second equalizers are inserted respectively in said first and second transmission lines at a control station located between said first and second stations.

11. A method for conditioning first and second transmission lines with a plurality of adjustable equalizer devices, said first transmission line linking a first communications station to a second communication station and passing through a control station between said first and second communications stations, said second transmission line linking said second communications station to said first communications station and passing through said control station, said first and second communications stations each having a loop key for connecting said first transmission line to said second transmission line, said method comprising the steps of:

a. transmitting a magnetically pre-recorded test signal from said first station over a first portion of the unequalized first transmission line;
b. recording on a magnetic storage medium the signal received at said control station from said first portion of said first transmission line in response to said pre-recorded test signal transmitted in step (a);
c. playing said signal recorded in step (b) through a first equalizer device off-line;
d. adjusting said first equalizer device for a desired response to said signal recorded in step (b);
e. inserting said first equalizer in said first portion of said first transmission line at said control station;
f. closing the loop key at said first station;
g. transmitting said magnetically pre-recorded test signal from said control station toward said first station over a first portion of said second transmission line;
h. recording on a magnetic storage medium the signal received at said control station over the path comprising said first portion of said second transmission line, said first station loop key, said first portion of said first transmission line and said first equalizer in response to said test signal transmitted in step (g);
i. playing said signal recorded in step (h) through a second equalizer device off-line;
j. adjusting said second equalizer for a desired response;
k. inserting said second equalizer in said first portion of second transmission line at said control station;
l. transmitting said magnetically pre-recorded test signal from said second station over a second portion of said unequalized second transmission line;
m. recording on a magnetic storage medium the signal received at said control station from said second transmission line in response to the signal transmitted in step (l);
n. playing said signal recorded in step (m) through a third equalizer device off-line;
o. adjusting said third equalizer device for a desired response to said signal recorded in step (m);
p. inserting said third equalizer in said second transmission line at said control station;
q. closing the loop key at said second station;
r. transmitting said magnetically pre-recorded test signal from said control station toward said second station over a second unequalized portion of said first transmission line;
s. recording on a magnetic storage medium the signal received at said control station over the path comprising said second portion of said first transmission line, said second station loop key, said second portion of said second transmission line and said third equaliizer device in response to the signal transmitted in step (r);
t. playing said signal recorded in step (s) through a fourth equalizer device off-line;
u. adjusting said fourth equalizer device for a desired response to said signal recorded in step (s); and
v. inserting said fourth equalizer in said first transmission line at said control station.

12. The method according to claim 11 wherein said first, second, third and fourth equalizer devices are adjusted for a desired amplitude response in steps (d), (j), (o), and (u) respectively.

13. The method according to claim 12 wherein said first, second, third and fourth equalizer devices are adjusted for a desired signal delay response in steps (d), (j), (o) and (u) respectively after said respective amplitude response adjustments.

14. The method according to claim 13 wherein at least a portion of said pre-recorded test signal transmitted in steps (a), (g), (l) and (r) comprises a swept frequency signal.

* * * * *